(12) United States Patent
Wang (10) Patent No.: US 10,105,612 B2
(45) Date of Patent: Oct. 23, 2018

(54) MOTION DETERMINATION LIMITING DEVICE

(71) Applicant: Hangzhou Virtual And Reality Technology Co., LTD., Hangzhou (CN)

(72) Inventor: Bo Wang, Hangzhou (CN)

(73) Assignee: Hangzhou Virtual And Reality Technology Co., LTD., Hangzhou (CN)

( * ) Notice: Subject to any disclaimer, the term of this patent is extended or adjusted under 35 U.S.C. 154(b) by 0 days.

(21) Appl. No.: 15/706,779

(22) Filed: Sep. 18, 2017

(65) Prior Publication Data
US 2018/0161684 A1 Jun. 14, 2018

(30) Foreign Application Priority Data
Jul. 16, 2016 (CN) .......................... 2016 1 0558532

(51) Int. Cl.
| | | |
|---|---|---|
| *A63G 31/16* | (2006.01) | |
| *G06F 3/01* | (2006.01) | |
| *A63G 31/02* | (2006.01) | |
| *G05D 3/12* | (2006.01) | |
| *A63B 19/00* | (2006.01) | |

(52) U.S. Cl.
CPC ............. *A63G 31/16* (2013.01); *A63G 31/02* (2013.01); *G05D 3/12* (2013.01); *G06F 3/011* (2013.01)

(58) Field of Classification Search
CPC ........ A63G 31/00; A63G 31/08; A63G 31/10; A63G 31/16; A63G 1/00; A63G 1/30; A63G 7/00; A63B 19/00; A63B 19/04

USPC .... 472/59–62, 130; 434/29, 34, 35, 55, 247; 463/1, 37
See application file for complete search history.

(56) References Cited

U.S. PATENT DOCUMENTS

| | | | | |
|---|---|---|---|---|
| 4,402,500 | A * | 9/1983 | Coles | A63B 19/04 434/55 |
| 5,931,739 | A * | 8/1999 | Layer | G09B 9/02 434/55 |
| 6,283,859 | B1 * | 9/2001 | Carlson | B62D 5/006 188/267.1 |
| 8,137,205 | B2 * | 3/2012 | Cortelyou | A63G 31/00 472/130 |
| 8,480,501 | B2 * | 7/2013 | Nemeth | A63G 1/30 472/130 |

(Continued)

*Primary Examiner* — Kien Nguyen
(74) *Attorney, Agent, or Firm* — Gokalp Bayramoglu (57) ABSTRACT

The present invention relates to a motion determination limiting device including a housing. An extendable rod is arranged throughout the housing. A vertical position limiting mechanism and a horizontal position limiting mechanism are sleeved outside the extendable rod in a down-to-top manner. The housing is sleeved outside the vertical position limiting mechanism and the horizontal position limiting mechanism. A lower portion of the vertical position limiting mechanism is provided with a position limiting bearing. When the user is walking, an inclination is generated to drive the vertical position limiting mechanism in the present invention to stop the extendable rod from moving upwardly and downwardly, such that the position limitation in the vertical direction can be realized. Moreover, the rotation in horizontal direction is allowed, and the swings of the user can be limited via the horizontal position limiting mechanism.

10 Claims, 4 Drawing Sheets

(56) References Cited

U.S. PATENT DOCUMENTS 8,641,540 B2 * 2/2014 Feuer ................. A63G 7/00
                                                    434/55
2006/0136826 A1 * 6/2006 Makuta ............... A63F 13/08
                                                    463/37

* cited by examiner

MOTION DETERMINATION LIMITING DEVICE

CROSS REFERENCE TO RELATED APPLICATIONS

This application claims priority to Chinese Patent Application No. 201610558532.6, filed on Jul. 16, 2016, the entire content of which is incorporated herein by reference.

TECHNICAL FIELD

The present invention relates to the technical field of non-electrical variable control or adjusting system, and particularly to a smart motion determination and position limitation device.

BACKGROUND

Virtual reality technology is a technology of computer simulation systems that can create and experience a virtual world. The virtual reality technology that uses the computer to generate simulation environments is an interactive 3D dynamic vision and physical behavior simulation system integrated with multi-source information, in which users can immerse in the environments. Virtual reality technology mainly includes environment simulation, sensing, natural skills, and sensing apparatus, etc., wherein the natural skills refer to the head rotation, eye movement, gestures, or other physical behaviors of human being. The data corresponding to the motions of the participant is processed by the computer. Moreover, the user's input is responded by the computer in real-time, and fed back to the user's facial features. Such process is a critical part in the virtual reality technology.

With the further popularization of virtual reality technology, the virtual reality omni-directional moving platform allows users to walk in the virtual reality. Moreover, the virtual reality device should provide a position limitation in the vertical direction when the user is moving forward to offer an effective support for human body. Meanwhile, a horizontal rotation may be allowed to ensure that the human body changes direction normally. When the user is not walking, the movement in vertical direction should be released, so that users can squat and jump. Therefore, an essential part of the virtual reality omni-directional moving platform is a smart motion determination and position limitation device which can determine the current motion trend of the user and provide corresponding limitation to ensure the safety without influencing the effects of use.

SUMMARY OF THE INVENTION

The technical problem solved by the present invention is as below. In the prior art, with the further popularization of virtual reality technology, the virtual reality omni-directional moving platform allows users to walk in the virtual reality. Moreover, the virtual reality device should satisfy the condition where when the user is walking, a position limitation in the vertical direction should be provided to offer an effective support for human body. Meanwhile, a horizontal rotation may be allowed to ensure that the human body makes turns as usual. When the user is not in a walking state, the movement in vertical direction should be released, so that users can squat and jump. Therefore, an essential part of the virtual reality omni-directional moving platform is a device which can determine the current motion trend of the user and provide corresponding limitation to ensure the safety without influencing the effects of use. Accordingly, a motion determination and position limitation device with an improved structure is provided.

The technical solution used in the present invention is that, a motion determining and position limiting device comprises a housing. An extendable rod passes through the housing. A vertical position limiting mechanism and a horizontal position limiting mechanism are sleeved outside the extendable rod in a down-to-top manner. The housing is sleeved outside the vertical position limiting mechanism and the horizontal position limiting mechanism. A position limiting bearing is sleeved on a lower portion of the vertical position limiting mechanism.

Preferably, the vertical position limiting mechanism comprises a position locking gripper and a position locking gripper housing which are sleeved outside the extendable rod in an inside-to-outside manner. The position locking gripper is provided to cooperate with the position locking gripper housing; the position locking gripper is fixedly arranged outside the extendable rod. The position locking gripper housing is mounted on the housing through the bearing.

Preferably, the position locking gripper comprises a first cylindrical sleeve and a plurality of retractable arc pieces arranged on the top of the first cylindrical sleeve. The plurality of retractable arc pieces are connected with each other in a head-to-tail manner to form a shape of an inverted truncated cone. The position locking gripper housing is movably sleeved outside the position locking gripper. The position locking gripper housing comprises a second cylindrical sleeve and a sleeve with an inverted truncated cone shape. The sleeve with the inverted truncated cone shape fits with the plurality of arc pieces.

Preferably, a position limiting rubber block is provide in a space between an upper portion of the position locking gripper and the extendable rod. The position limiting rubber block is annular-shaped and sleeved outside the extendable rod.

Preferably, a clamping ring is provided on the top of the position locking gripper.

Preferably, the horizontal position limiting mechanism comprises a left-right position limiting disc. The left-right position limiting disc is arranged on the housing through the bearing. The left-right position limiting disc includes an elongated through hole. The elongated through hole includes a left plane, a right plane, a front arc surface, and a rear arc surface which are sequentially connected with each other along the horizontal direction in a head-to-tail manner. Left and right sides of the extendable rod are provided with a left position limiting plane and a right position limiting plane, respectively. The left position limiting plane fits with the left plane, and the right position limiting plane fits with the right plane.

Preferably, the housing comprises a housing body, the housing body is provided with an upper cover and a lower cover fitting with the upper cover. The lower cover is sleeved outside the position limiting bearing.

Preferably, an adjusting nut is sleeved outside the position locking gripper. The adjusting nut is arranged below the position limiting bearing.

Preferably, a position limiting nut is sleeved outside the position fixing gripper. The position limiting nut is arranged below the adjusting nut.

Preferably, a plastic casing tube is sleeved on a lower portion of the extendable rod; the plastic casing tube is arranged between the extendable rod the position locking gripper.

The present invention provides a motion determination limiting device with an improved structure. An extendable rod is arranged throughout the housing. A vertical position limiting mechanism and a horizontal position limiting mechanism are sleeved outside the extendable rod in a down-top manner. The housing is sleeved outside the vertical position limiting mechanism and the horizontal position limiting mechanism. The position is limited by the position limiting bearing arranged around the lower portion of the vertical position limiting mechanism. When the user is walking, an inclination is generated to drive the vertical position limiting mechanism in the present invention to stop the extendable rod from moving upward and downward, such that the position limitation in the vertical direction can be realized. Moreover, the rotation in horizontal direction is allowed, and the swings of the user can be limited via the horizontal position limiting mechanism, such that, a more stable walking attitude can be provided. When the user is not walking, the vertical position limiting mechanism does not operate, so the movement of the extendable rod in the vertical direction is released, and the user can do actions like squat, jump, etc.

The following are the advantages of the present invention.
1. When the user moves forward or backward, the limiting device can provide an effective support to prevent the user from slipping down while users can turn around without restrictions.
2. When the user squats, jumps etc., the limiter does not operate, such that the user would not be interfered.
3. Left and right position limitations are provided while the user is walking, so the horizontal swings are avoided, thereby increasing the stability during walking.
4. No electrical power is used, so security issues such as a sudden power failure can be avoided.

The present invention has the advantages of simple structure, convenient use, and energy saving.

DETAILED DESCRIPTION OF THE INVENTION

The present invention will be further described in detail through the embodiments. However, the scope of the present invention is not limited to the embodiments.

As shown in the drawings, the present invention relates to a motion determining and position limiting device. The device includes housing 1. Extendable rod 2 passes through housing 1. A vertical position limiting mechanism and a horizontal position limiting mechanism are sleeved outside extendable rod 2 from bottom to top. Housing 1 is sleeved outside the vertical position limiting mechanism and the horizontal position limiting mechanism. Position limiting bearing 3 is sleeved outside the lower portion of the vertical position limiting mechanism.

In the present invention, extendable rod 2 passes through housing 1 of the position limiting device. Moreover, a vertical position limiting mechanism and a horizontal position limiting mechanism are sleeved outside extendable rod 2 from bottom to top. Housing 1 is sleeved outside the vertical position limiting mechanism and the horizontal position limiting mechanism. The position is limited by position limiting bearing 3 that is sleeved on the lower portion of the vertical position limiting mechanism. If inclination occurs when the user is walking, the vertical position limiting mechanism of the present invention will be driven to stop extendable rod 2 from moving upwards and downwards, so as to achieve the function of limiting the position in the vertical direction. Moreover, the rotation in horizontal direction is allowed, and the swings of the user are restricted by the horizontal position limiting mechanism to provide a more stable walking attitude. When the user is not walking, the vertical position limiting mechanism is not operated, and extendable rod 2 is released to move in the vertical direction, such that the user is able to squat, jump, etc.

Figure 2:
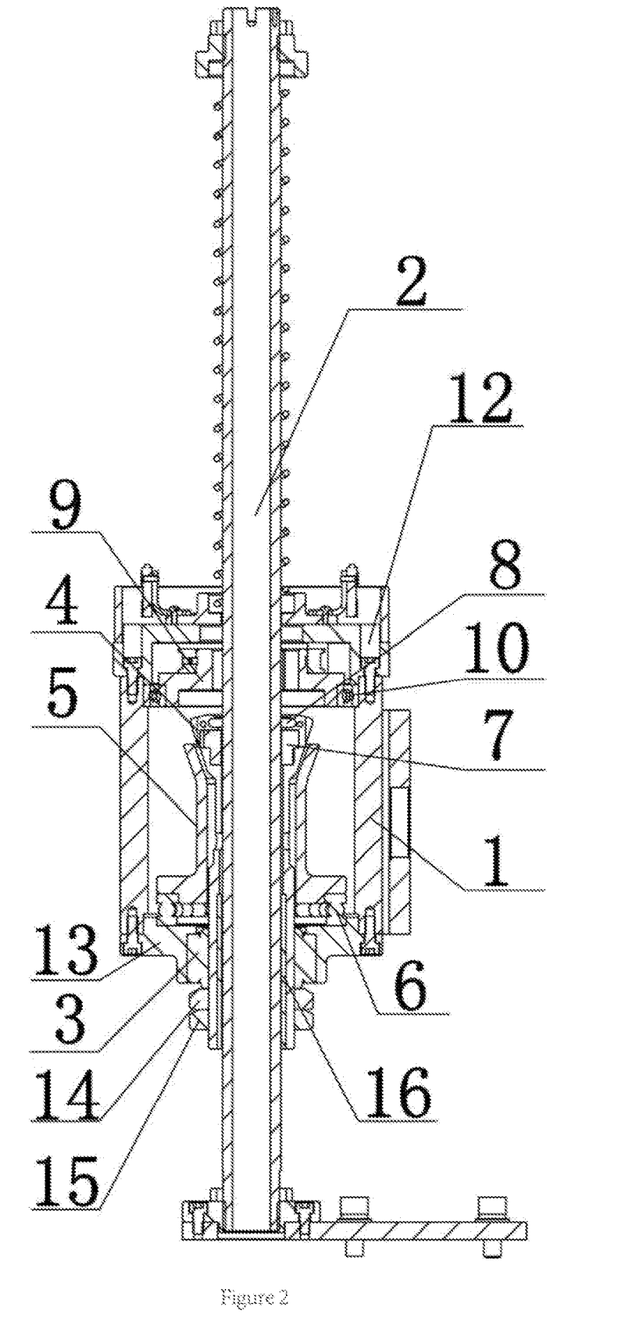
FIG. 2 is a structural schematic diagram of a cross-sectional view of the present invention.
Figure 3:
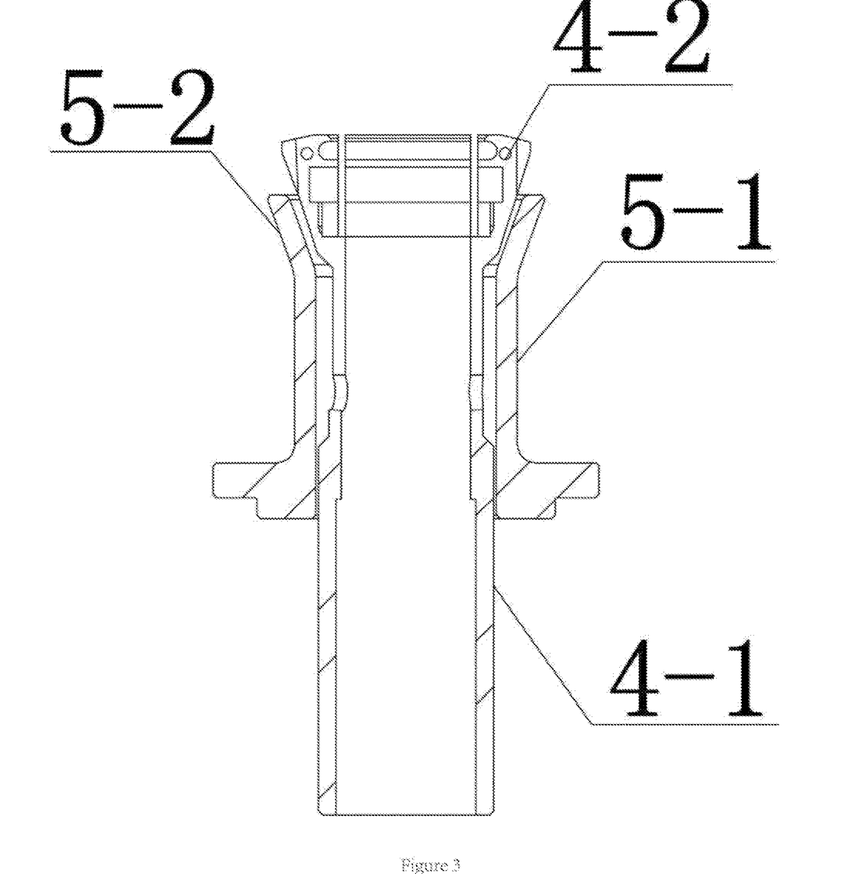
FIG. 3 is a structural schematic diagram of a cross-sectional view of a position locking gripper and a position locking gripper housing in a vertical position limiting mechanism of the present invention.

The vertical position limiting mechanism includes position locking gripper 4 and position locking gripper housing 5 which are sleeved outside extendable rod 2 from inside to outside. Position locking gripper 4 is provided corresponding to position locking gripper housing 5. Position locking gripper 4 is fixedly arranged outside extendable rod 2. Position locking gripper housing 5 is mounted on housing 1 through bearing 6.

Position locking gripper 4 includes first cylindrical sleeve 4-1 and a plurality of retractable arc pieces 4-2 arranged on the top of first cylindrical sleeve 4-1. Retractable arc pieces 4-2 are connected with each other in a head-to-tail manner to form a shape of an inverted truncated cone. Moreover, position locking gripper housing 5 is movably sleeved outside position locking gripper 4. Position locking gripper housing 5 includes second cylindrical sleeve 5-1 and inverted truncated cone shape sleeve 5-2. Inverted truncated cone shape sleeve 5-2 is arranged to match arc pieces 4-2.

A space between an upper portion of position locking gripper 4 and extendable rod 2 is provided with position limiting rubber block 7. Position limiting rubber block 7 is annular-shaped and sleeved outside extendable rod 2.

In the present invention, when extendable rod 2 is moving in the vertical direction, position locking gripper 4 grips extendable rod 2 to achieve the function of position locking and position limiting. Position locking gripper housing 5 is used to apply force to position locking gripper 4 when position locking gripper 4 is lifted upward, so that position locking gripper 4 can lock extendable rod 2 to achieve the function of limiting extendable rod 2.

In the present invention, position locking gripper 4 includes first cylindrical sleeve 4-1 and a plurality of retractable arc pieces 4-2 arranged on the top of first cylindrical sleeve 4-1. Retractable arc pieces 4-2 are connected with each other in a head-to-tail manner to form a shape of an inverted truncated cone. Moreover, position locking gripper housing 5 is movably sleeved outside position locking gripper 4. Position locking gripper housing 5 includes second cylindrical sleeve 5-1 and inverted truncated cone shape sleeve 5-2. Inverted truncated cone shape sleeve 5-2 is arranged to match arc pieces 4-2. That is to say, position locking gripper housing 5 is able to move with respect to position locking gripper 4. When position locking gripper housing 5 moves upward with respect to position locking gripper 4, inverted truncated cone shape sleeve 5-2 acts on retractable arc pieces 4-2 and force retractable arc pieces 4-2 to retract, such that the part of position locking gripper 4 that is located above first cylindrical sleeve 4-1 retracts to realize the function of gripper.

In the present invention, when the user is moving forward or backward, extendable rod 2 is driven to have an inclination angle. Extendable rod 2 swings in a sector with position limiting bearing 3 as the center of the circle to drive position locking gripper 4 to move upward vertically inside position locking gripper housing 5. During this process, position locking gripper 4 and position locking gripper housing 5 both incline. During the inclination, position locking gripper housing 5 will slightly raises to adapt and match the change of the inclination angle of extendable rod 2 and the distance toward the inclination direction of extendable rod 2. However, since position locking gripper 4 is fixedly and peripherally arranged on extendable rod 2, position locking gripper 4 is unable to make cooperative action similar to that of position locking gripper housing 5, and thus moves relatively downward inside position locking gripper housing 5. Under the action of position locking gripper 4 and the inclination of position locking gripper 4, the top of position locking gripper 4 retracts. Position locking gripper 4 retracts inwardly under the action of position locking gripper housing 5, until extendable rod 2 is gripped, so as to restrict the vertical movement of extendable rod 2. Moreover, bearing 6 corresponding to position locking gripper housing 5 can also ensure position locking gripper housing 5 to turn horizontally, such that the object to restrict extendable rod 2 from moving upward and downward and release the horizontally turning can be achieved.

In the present invention, position limiting rubber block 7 is provided in a space between an upper portion of position locking gripper 4 and extendable rod 2. Position limiting rubber block 7 is annular-shaped and sleeved outside extendable rod 2. When the user is moving forward or backward, position locking gripper 4 retracts inwardly under the action of position locking gripper housing 5, so as to drive position limiting rubber block 7 to retract toward extendable rod 2. Therefore, both the position limiting function and the friction force between the vertical position limiting mechanism and extendable rod 2 are ensured. Moreover, the structure of position limiting rubber block 7 may wear the vertical position limiting mechanism and extendable rod 2 as little as possible, such that the lifespan of the present invention can be guaranteed.

The top of position locking gripper 4 is provided with clamping ring 8.

In the present invention, the top of position locking gripper 4 is provided with clamping ring 8 for assisting the reset of position locking gripper 4. When the user is not walking, there is no inclination angle, and position locking gripper 4 can restore to the opening state under the action of elasticity. Under this condition, position limiting rubber block 7 is not in contact with extendable rod 2, so that extendable rod 2 can move in the vertical direction, and the user can take actions such as squatting, jumping, and horizontally turning.

Figure 4:
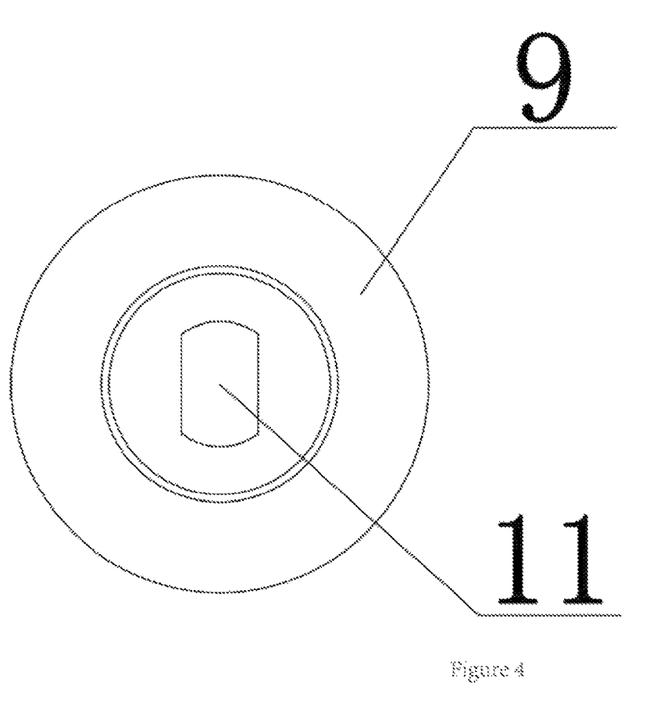
FIG. 4 is a structural schematic diagram of a disc in the present invention.

The horizontal position limiting mechanism includes left-right position limiting disc 9. Left-right position limiting disc 9 is arranged on housing 1 through bearing 10. Left-right position limiting disc 9 includes elongated through hole 11. Elongated through hole 11 includes a left plane, a right plane, a front arc surface, and a rear arc surface which are sequentially connected with each other in the horizontal direction in a head-to-tail manner. The left and right sides of extendable rod 2 are provided with a left position limiting plane and a right position limiting plane, respectively. The left position limiting plane cooperates with the left plane, and the right position limiting plane cooperates with the right plane.

In the present invention, left-right position limiting disc 9 is mainly used to restrict the user in the left and right directions without affecting the movement of the user in the forward and backward directions.

In the present invention, left-right position limiting disc 9 includes elongated through hole 11, wherein, elongated through hole 11 includes a left plane, a right plane, a front arc surface, and a rear arc surface which are sequentially connected with each other in the horizontal direction in a head-to-tail manner. Moreover, the left and right sides of extendable rod 2 are provided with a left position limiting plane and a right position limiting plane, respectively. After extendable rod 2 is inserted into elongated through hole 11 of left-right position limiting disc 9, the left and right sides of elongated through hole 11 can closely contact with the flat portion of extendable rod 2, i.e. the left position limiting plane and the right position limiting plane. When extendable rod 2 is rotating horizontally, left-right position limiting disc 9 rotates together with extendable rod 2 under the support of bearing 10. Therefore, no matter at what angle extendable rod 2 rotates horizontally, only forward and backward swings are allowable and the left and right swings are not allowed. Therefore, the stability of the user in walking can be ensured.

Figure 1:
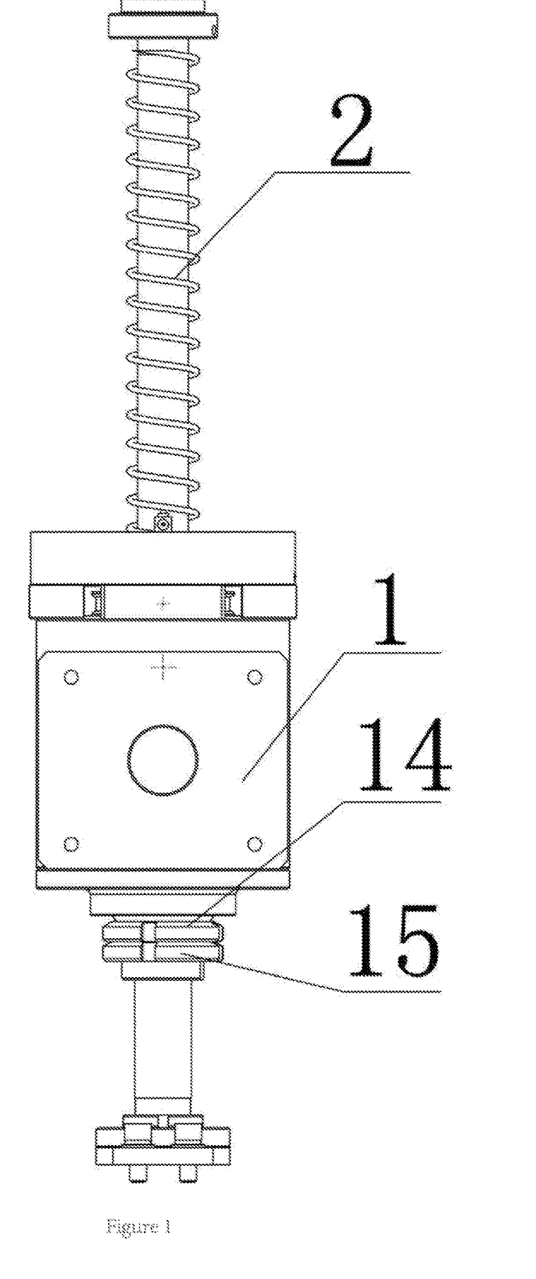
FIG. 1 is a structural schematic diagram of the present invention.

The housing 1 includes a housing body. The housing body is provided with upper cover 12 and lower cover 13. Lower cover 13 is sleeved outside position limiting bearing 3.

In the present invention, housing 1 includes a housing body. The housing body is provided with upper cover 12 and lower cover 13 to protect the vertical position limiting mechanism and the horizontal position limiting mechanism and carry the relevant parts of the vertical position limiting mechanism and the horizontal position limiting mechanism, such that the integrity and operative stability of the present invention are ensured.

Adjusting nut 14 is sleeved outside position locking gripper 4, and adjusting nut 14 is arranged below position limiting bearing 3.

In the present invention, adjusting nut 14 is sleeved outside position locking gripper 4, and adjusting nut 14 is arranged below position limiting bearing 3. When adjusting nut 14 is tightened, the distance between adjusting nut 14 and position locking gripper 4 is shortened. Since the pitch angle of extendable rod 2 is proportional to the working stroke of position locking gripper 4 gripping extendable rod 2, the extensible distance of extendable rod 2 is also reduced, such that the purpose of fitting the experiencers having different walking amplitudes can be achieved.

Position limiting nut 15 is sleeved outside position locking gripper 4, and position limiting nut 15 is arranged below adjusting nut 14.

In the present invention, position limiting nut 15 is sleeved outside position locking gripper 4, and position limiting nut 15 is arranged below adjusting nut 14. Position limiting nut 15 can tighten and fix adjusting nut 14 to prevent adjusting nut 14 from being loose in use, such that the safety of the present invention is ensured.

The lower portion of extendable rod 2 is further sleeved with plastic casing tube 16. The plastic casing tube 16 is arranged between extendable rod 2 and position locking gripper 4.

In the present invention, plastic casing tube 16 is arranged between extendable rod 2 and position locking gripper 4 to reduce the frictional force between extendable rod 2 and position locking gripper 4, substantially.

In the present invention, plastic casing tube 16 can be sleeved on the lower portion of extendable rod 2 for the sake of cost.

In the present invention, plastic casing tube 16 can be made of tetrafluoride materials. Since the friction coefficient of the tetrafluoride materials is extremely small (e.g. only one-fifth of that of polyethylene material), and the intermolecular force in the fluorine-carbon chains is extremely low, the tetrafluoride materials is not viscous and maintains excellent mechanical properties in a wide temperature range i.e. −196~260° C. One characteristic of perfluorocarbon polymer is that it does not become brittle at low temperature.

The technical problem solved by the present invention is that, in the prior art, with the further popularization of virtual reality technology, the virtual reality omni-directional moving platform allows users to walk in the virtual reality. Moreover, the virtual reality device should provide a position limitation in the vertical direction when the user is walking to offer an effective support for human body. Meanwhile, a horizontal rotation may be allowed to ensure that the human body turns as usual. When the user is not in a walking state, the movement in vertical direction should be released, so that users can squat and jump. Therefore, an essential part of the virtual reality omni-directional moving platform is a device which can determine the current motion trend of the user and provide corresponding limitation to ensure the safety without influencing the effects of use. Extendable rod 2 is arranged throughout housing 1. A vertical position limiting mechanism and a horizontal position limiting mechanism are sleeved outside extendable rod 2 in a down-top manner. Housing 1 is sleeved outside the vertical position limiting mechanism and the horizontal position limiting mechanism. The position is limited by position limiting bearing 3 sleeved on the lower portion of the vertical position limiting mechanism. When the user is walking, an inclination is generated to drive the vertical position limiting mechanism in the present invention to stop extendable rod 2 from moving upwardly and downwardly, such that the position limitation in the vertical direction can be realized. Moreover, the rotation in horizontal direction is allowed, and the swings of the user can be limited via the horizontal position limiting mechanism, such that, a more stable walking attitude can be provided. When the user is not walking, the vertical position limiting mechanism does not operate, so the movement of extendable rod 2 in the vertical direction is released, and the user can do actions like squat, jump, etc.

The following are the advantages of the present invention. When the user moves forward or backward, the limiting device can provide an effective support to prevent the user from slipping down while users can turn around without restrictions. When the user squats, jumps, etc., the limiter does not operate, such that the user would not be interfered. Left and right position limitations are provided while the user is walking, which avoids the horizontal swings, thereby increasing the stability during walking. No electrical power is used, so security issues such as a sudden power failure can be avoided.

The present invention has the advantages of simple structure, convenient use, and energy saving, etc.

What is claimed is:

1. A motion determining and position limiting device, comprising:

a housing;

an extendable rod passing through the housing;

a vertical position limiting mechanism and a horizontal position limiting mechanism sleeved outside the extendable rod in a down-to-top manner;

wherein, the housing is sleeved outside the vertical position limiting mechanism and the horizontal position limiting mechanism; and a position limiting bearing is sleeved on a lower portion of the vertical position limiting mechanism.

2. The motion determining and position limiting device of claim 1, wherein the vertical position limiting mechanism comprises a position locking gripper and a position locking gripper housing; wherein the position locking gripper and the position locking gripper housing are sleeved outside the extendable rod in an inside-to-outside manner; the position locking gripper is provided to cooperate with the position locking gripper housing; the position locking gripper is fixedly arranged outside the extendable rod; the position locking gripper housing is mounted on the housing through the bearing.

3. The motion determining and position limiting device of claim 2, wherein the position locking gripper comprises a first cylindrical sleeve and a plurality of retractable arc pieces arranged on the top of the first cylindrical sleeve; the plurality of retractable arc pieces are connected with each other in a head-to-tail manner to form a shape of an inverted truncated cone; the position locking gripper housing is movably sleeved outside the position locking gripper; the position locking gripper housing comprises a second cylindrical sleeve and a sleeve with an inverted truncated cone shape; the sleeve with the inverted truncated cone shape fits with the plurality of arc pieces.

4. The motion determination limiting device of claim 3, wherein a position limiting rubber block is provide in a space between an upper portion of the position locking gripper and the extendable rod; the position limiting rubber block is annular-shaped and sleeved outside the extendable rod.

5. The motion determining and position limiting device of claim 3, wherein a clamping ring is provided on the top of the position locking gripper.

6. The motion determining and position limiting device of claim 2, wherein an adjusting nut is sleeved outside the position locking gripper; and the adjusting nut is arranged below the position limiting bearing.

7. The motion determining and position limiting device of claim 6, wherein a position limiting nut is sleeved outside the position fixing gripper; and the position limiting nut is arranged below the adjusting nut.

8. The motion determining and position limiting device of claim 1, wherein the horizontal position limiting mechanism comprises a left-right position limiting disc; the left-right position limiting disc is arranged on the housing through the bearing; the left-right position limiting disc includes an elongated through hole; the elongated through hole includes a left plane, a right plane, a front arc surface, and a rear arc surface sequentially connected with each other along the horizontal direction in a head-to-tail manner; left and right sides of the extendable rod are provided with a left position limiting plane and a right position limiting plane, respectively; and the left position limiting plane fits with the left plane, and the right position limiting plane fits with the right plane.

9. The motion determining and position limiting device of claim 1, wherein the housing comprises a housing body, the housing body is provided with an upper cover and a lower cover fitting with the upper cover; and the lower cover is sleeved outside the position limiting bearing.

10. The motion determining and position limiting device of claim 1, wherein a plastic casing tube is sleeved on a lower portion of the extendable rod; and the plastic casing tube is arranged between the extendable rod and a position locking gripper.

\* \* \* \* \*